United States Patent
Jiang et al.

(10) Patent No.: US 10,230,793 B2
(45) Date of Patent: Mar. 12, 2019

(54) METHOD AND APPARATUS FOR DATA-SHARING

(71) Applicant: Nokia Technologies Oy, Espoo (FI)

(72) Inventors: Zhenghao Jiang, Shandong (CN); Fangqian Wang, Beijing (CN); Guoxin Ma, Beijing (CN); Chaomin Xue, Beijing (CN)

(73) Assignee: Nokia Technologies Oy, Espoo (FI)

( * ) Notice: Subject to any disclaimer, the term of this patent is extended or adjusted under 35 U.S.C. 154(b) by 271 days.

(21) Appl. No.: 15/104,458

(22) PCT Filed: Dec. 16, 2013

(86) PCT No.: PCT/CN2013/089488
§ 371 (c)(1),
(2) Date: Jun. 14, 2016

(87) PCT Pub. No.: WO2015/089695
PCT Pub. Date: Jun. 25, 2015

(65) Prior Publication Data
US 2017/0006095 A1    Jan. 5, 2017

(51) Int. Cl.
*G06F 15/16* (2006.01)
*H04L 29/08* (2006.01)
(Continued)

(52) U.S. Cl.
CPC ........ *H04L 67/1095* (2013.01); *H04L 43/106* (2013.01); *H04L 69/28* (2013.01);
(Continued)

(58) Field of Classification Search
CPC ......... H04L 67/16; H04L 47/827; G06F 8/60; G06F 9/5072; G06F 9/5061
(Continued)

(56) References Cited

U.S. PATENT DOCUMENTS 8,447,829 B1 * 5/2013 Geller ................. G06F 9/468
709/217
2007/0101145 A1 * 5/2007 Sachdeva ............ H04L 63/0815
713/176
(Continued)

FOREIGN PATENT DOCUMENTS

CN        1430449 A        7/2003
CN      101754421 A        6/2010
(Continued)

OTHER PUBLICATIONS

Office action for corresponding Japanese Patent Application No. 2016-539944, dated Aug. 22, 2017, 3 pages of office action and 3 pages of Translation available.
(Continued)

*Primary Examiner* — Krisna Lim
(74) *Attorney, Agent, or Firm* — Nokia Technologies Oy

(57) ABSTRACT

A method, corresponding apparatuses, and a computer program product for data-sharing are provided. The method comprises transmitting, from a user equipment of a plurality of user equipments within a local area, a first data-sharing request message to at least another user equipment of the plurality of user equipments. The method also comprises receiving, at the user equipment, at least one second data-sharing request message transmitted from at least the other user equipment, wherein the first data-sharing request message and at least one second data-sharing request message each include a timestamp indicating a time at which the data-sharing request message is transmitted. The method further comprises comparing the timestamp included in the first data-sharing request message and the timestamp included in the at least one second data-sharing request message. The method additionally comprises determining, based on a result of the comparing, whether the user
(Continued)

equipment acts as a sender or receiver in the data-sharing to be performed. With the claimed inventions, faster data-sharing may be realized.

13 Claims, 3 Drawing Sheets

(51) Int. Cl.
*H04L 29/06* (2006.01)
*H04L 12/26* (2006.01)
*H04W 4/021* (2018.01)
*H04W 8/24* (2009.01)
*H04W 4/80* (2018.01)

(52) U.S. Cl.
CPC ............ *H04W 4/021* (2013.01); *H04W 8/24* (2013.01); *H04W 4/80* (2018.02)

(58) Field of Classification Search
USPC .......................................................... 709/219
See application file for complete search history.

(56) References Cited

U.S. PATENT DOCUMENTS

| | | | |
|---|---|---|---|
| 2008/0299953 | A1 | 12/2008 | Rao |
| 2011/0035550 | A1 | 2/2011 | Adams |
| 2011/0081923 | A1 | 4/2011 | Forutanpour et al. |
| 2012/0209808 | A1 | 8/2012 | Tien et al. |
| 2014/0207919 | A1* | 7/2014 | Kowalski ............ H04L 41/0896 709/220 |

FOREIGN PATENT DOCUMENTS

| | | |
|---|---|---|
| CN | 102377457 A | 3/2012 |
| CN | 102440013 A | 5/2012 |
| EP | 1762070 B1 | 2/2009 |
| EP | 2348688 A1 | 7/2011 |
| JP | H0951559 A | 2/1997 |
| JP | 2007-096946 A | 4/2007 |
| JP | 2007-148659 A | 6/2007 |
| JP | 2007-174388 A | 7/2007 |
| JP | 2011-009850 A | 1/2011 |
| WO | 2002/078288 A1 | 10/2002 |
| WO | 2006/010977 A1 | 2/2006 |
| WO | 2007/099639 A1 | 9/2007 |
| WO | 2012/174152 A2 | 12/2012 |
| WO | 2013/074102 A1 | 5/2013 |
| WO | 2013/086993 A1 | 6/2013 |
| WO | 2013/125819 A1 | 8/2013 |

OTHER PUBLICATIONS

Office action for corresponding Korean Patent Application No. 2016-7019077, dated Mar. 20, 2018, 5 pages of office action and no page of Translation available.

International Search Report and Written Opinion for corresponding Patent Cooperation Treaty Application No. PCT/CN2013/089488, dated Sep. 23, 2014, 11 pages.

"iOS 7 Feature Focus: Airdrop Simplifies Speedy Local File Transfer", Appleinsider, Retrieved on Aug. 4, 2017, Webpage available at: http://appleinsider.com/articles/13/09/18/ios-7-feature-focus-airdrop-simplifies-speedy-local-file-transfer.

Extended European Search Report for corresponding European Patent Application No. 13899354.8, dated Jul. 11, 2017, 7 pages.

Office action for corresponding Chinese Patent Application No. 201380081645.6, dated Feb. 26, 2018, 10 pages of office action and 3 pages of Translation available.

Office action for corresponding Mexican Patent Application No. MX/a/2016/007765, dated Jun. 8, 2018, 3 pages of office action and no page of translation available.

Office action received for corresponding Chinese Patent Application No. 201380081645.6, dated Nov. 2, 2018, 10 pages of office action and 5 pages of Translation available.

* cited by examiner

METHOD AND APPARATUS FOR DATA-SHARING

RELATED APPLICATION

This application was originally filed as Patent Cooperation Treaty Application No. PCT/CN2013/089488 filed Dec. 16, 2013.

FIELD OF THE INVENTION

Exemplary embodiments of the present disclosure generally relate to wireless communication techniques. More particularly, the exemplary embodiments of the present disclosure relate to a method, apparatuses, and a computer program product for data-sharing in a wireless network environment.

BACKGROUND OF THE INVENTION

The following description of background art may include insights, discoveries, understandings or disclosures, or associations together with disclosures not known to the relevant art prior to the present disclosure but provided by the present disclosure. Some such contributions of the present disclosure may be specifically pointed out below, while other such contributions of the present disclosure will be apparent from their context.

With rapid developments of a variety of wireless communication techniques, more and more users share contents of interest, such as images, audio files, video files, or video clips among their close friends, using their mobile phones or handsets (collectively referred to as "user equipment" throughout the present disclosure) with corresponding functionality enabled. Users in close proximity with one another can share various types of data using a proximity-limited technique, such as a Bluetooth® or WiFi technique.

SUMMARY OF THE INVENTION

The following presents a simplified summary of the present disclosure in order to provide a basic understanding of some aspects of the present disclosure. It should be noted that this summary is not an extensive overview of the present disclosure and that it is not intended to identify key/critical elements of the present disclosure or to delineate the scope of the present disclosure. Its sole purpose is to present some concepts of the present disclosure in a simplified form as a prelude to the more detailed description that is presented later.

According to an aspect of the present disclosure, there is provided a method. The method comprises transmitting, from a user equipment of a plurality of user equipments within a local area, a first data-sharing request message to at least another user equipment of the plurality of user equipments. The method also comprises receiving, at the user equipment, at least one second data-sharing request message transmitted from at least the other user equipment, wherein the first data-sharing request message and at least one second data-sharing request message each include a timestamp indicating a time at which the data-sharing request message is transmitted. The method further comprises comparing the timestamp included in the first data-sharing request message and the timestamp included in the at least one second data-sharing request message. Additionally, the method comprises determining, based on a result of the comparing, whether the user equipment acts as a sender or receiver in the data-sharing to be performed.

In one embodiment, the transmitting and receiving are triggered upon an action including at least one of swaying, tapping, flicking the user equipment.

In another embodiment, the first data-sharing request message and the at least one second data-sharing request message each include information associated with the data-sharing to be performed between the user equipments.

In an additional embodiment, the information relates to at least one of a data type of the data to be shared or an action type of an action to be performed for the data-sharing.

In yet another embodiment, the first data-sharing request message and at least one second data-sharing request message each include an identity of the user equipment which transmits the respective data-sharing request message.

In a further embodiment, the method comprises determining the user equipment as the sender and at least the other user equipment as the receiver in the data-sharing if the comparing indicates that the first data-sharing request message is transmitted earlier than the at least one second data-sharing request message and determining the user equipment as the receiver and at least the other user equipment as the sender in the data-sharing if the comparing indicates that the first data-sharing request message is transmitted later than the at least one second data-sharing request message.

According to another aspect of the present disclosure, there is provided an apparatus. The apparatus comprises means for transmitting, from a user equipment of a plurality of user equipments within a local area, a first data-sharing request message to at least another user equipment of the plurality of user equipments. The apparatus also comprises means for receiving, at the user equipment, at least one second data-sharing request message transmitted from at least the other user equipment, wherein the first data-sharing request message and at least one second data-sharing request message each include a timestamp indicating a time at which the data-sharing request message is transmitted. The apparatus further comprises means for comparing the timestamp included in the first data-sharing request message and the timestamp included in the at least one second data-sharing request message. The apparatus additionally comprises means for determining, based on a result of the comparing, whether the user equipment acts as a sender or receiver in the data-sharing to be performed.

According to another aspect of the present disclosure, there is provided an apparatus. The apparatus comprises at least one processor and at least one memory including computer program instructions. The at least one memory and computer program instructions are configured to, with the at least one processor, cause the apparatus at least to transmit, from a user equipment of a plurality of user equipments within a local area, a first data-sharing request message to at least another user equipment of the plurality of user equipments. The at least one memory and computer program instructions are configured to, with the at least one processor, also cause the apparatus at least to receive, at the user equipment, at least one second data-sharing request message transmitted from at least the other user equipment, wherein the first data-sharing request message and at least one second data-sharing request message each include a timestamp indicating a time at which the data-sharing request message is transmitted. The at least one memory and computer program instructions are configured to, with the at least one processor, further cause the apparatus at least to compare the timestamp included in the first data-sharing request message and the timestamp included in the at least one second data-sharing request message. The at least one memory and computer program instructions are configured to, with the at least one processor, additionally cause the apparatus at least to determine, based on a result of the comparing, whether the user equipment acts as a sender or receiver in the data-sharing to be performed.

According to another aspect of the present disclosure, there is provided a non-transitory computer readable medium having program code stored thereon, the program code configured to direct an apparatus, when executed, to transmit, from a user equipment of a plurality of user equipments within a local area, a first data-sharing request message to at least another user equipment of the plurality of user equipments. The program code is configured to also direct the apparatus, when executed, to receive, at the user equipment, at least one second data-sharing request message transmitted from at least the other user equipment, wherein the first data-sharing request message and at least one second data-sharing request message each include a timestamp indicating a time at which the data-sharing request message is transmitted. The program code is configured to further direct the apparatus, when executed, to compare the timestamp included in the first data-sharing request message and the timestamp included in the at least one second data-sharing request message. The program code is configured to additionally direct the apparatus, when executed, to determine, based on a result of the comparing, whether the user equipment acts as a sender or receiver in the data-sharing to be performed.

The above description outlines the various aspects and embodiments of the present disclosure. The solutions as set forth in the various embodiments should not be understood as operating independently but may be carried out in combination with each other, as will be known to those skilled in the art under the teaching of the present disclosure.

By virtue of the solutions as proposed by the present disclosure, users near each other or within a local area are able to share digital assets in an easy and seamless manner since no intermediate node is needed. Further, an actor conflict in the multiparty data sharing can be overcome based on determining the user equipment as the sender or receiver through comparison of the respective timestamps, thereby achieving faster data sharing over the prior art.

BRIEF DESCRIPTION OF THE DRAWINGS

Figure 1:
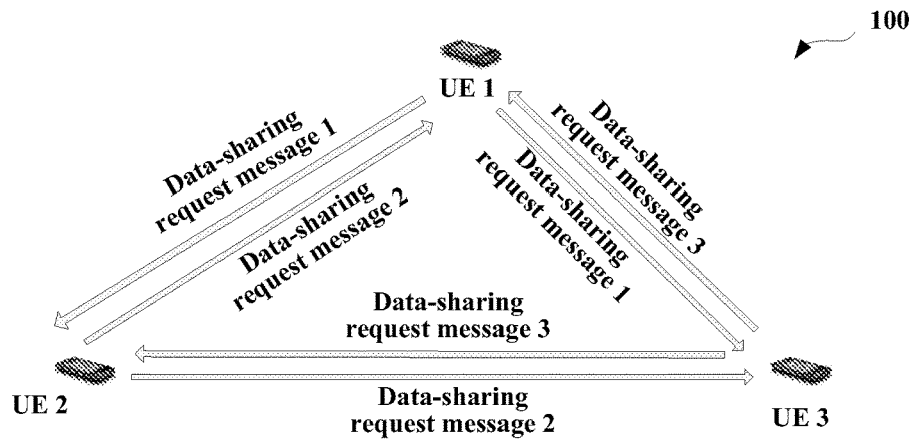
Figure 2:
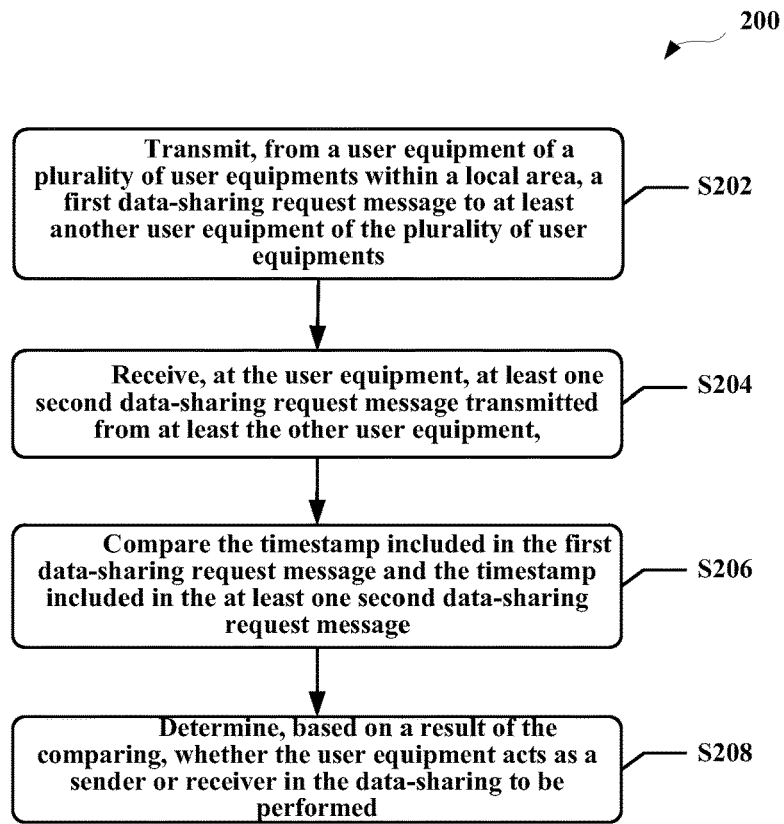
Figure 3:
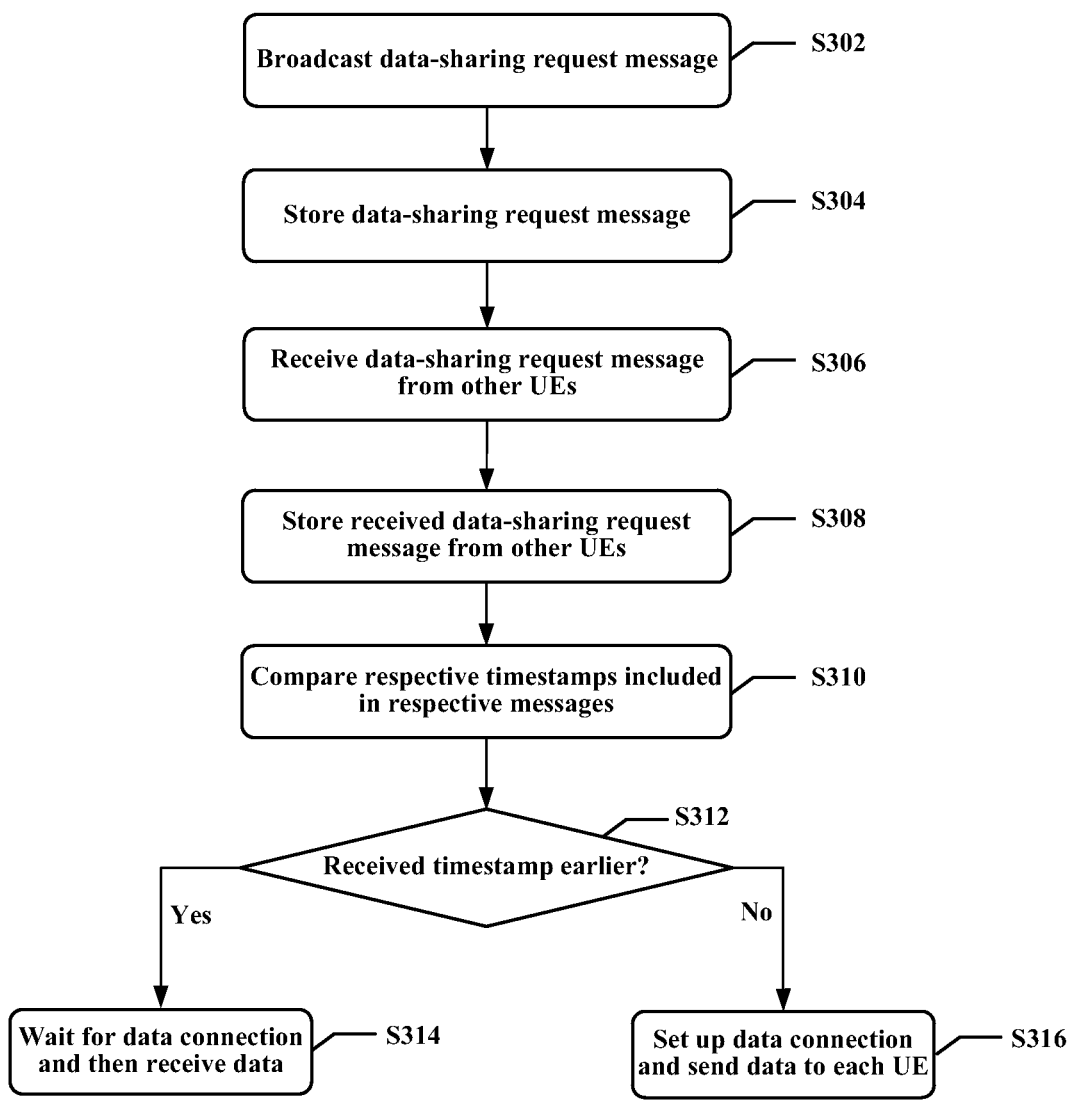
Figure 4:
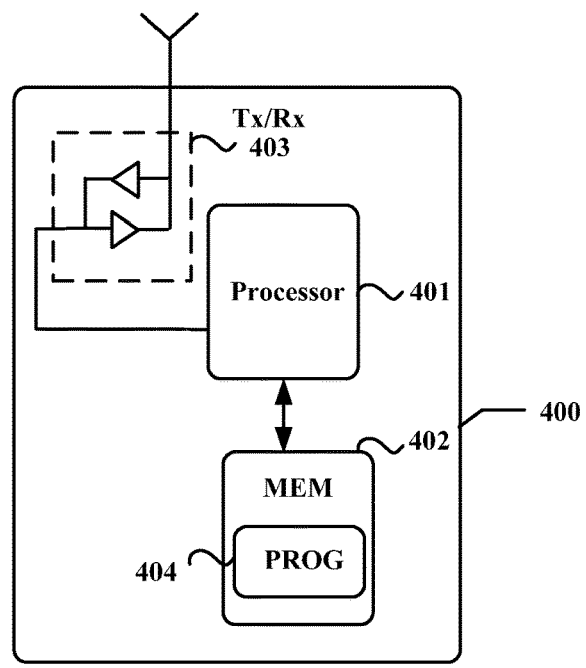
Figure 5:
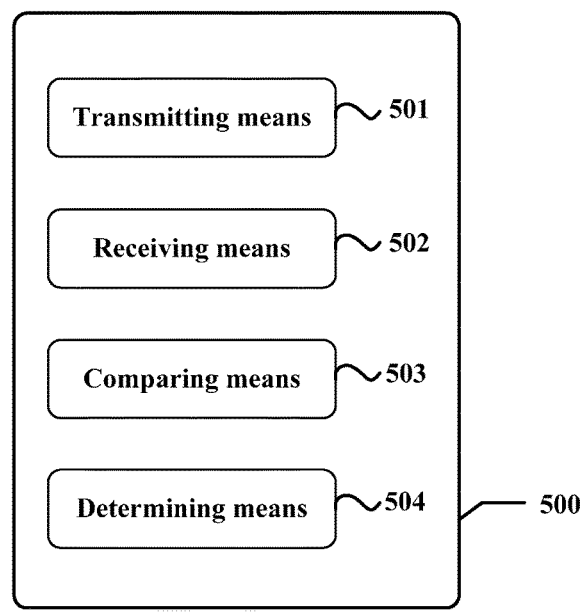

Having thus described some exemplary embodiments of the present disclosure in general terms, reference will now be made to the accompanying drawings, which are not necessarily drawn to scale, and wherein:

FIG. 1 illustrates an exemplary network architecture including a plurality of user equipments (UEs) wishing to share data therebetween in which the embodiments of the present disclosure may be practiced;

FIG. 2 is a simplified flow chart schematically illustrating a method for performing data-sharing in a network, for example, one as illustrated in FIG. 1, according to an embodiment of the present disclosure;

FIG. 3 is a detailed flow chart schematically illustrating a method for performing data-sharing according to another embodiment of the present disclosure;

FIG. 4 is a simplified schematic block diagram illustrating an apparatus for performing data-sharing according to an embodiment of the present disclosure; and FIG. 5 is a simplified schematic block diagram illustrating another apparatus for performing data-sharing according to another embodiment of the present disclosure.

DETAILED DESCRIPTION OF EMBODIMENTS

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, the user equipment may be any type of a user communication device (for example, cell phone, smart phone, reader, tablet or pad device, or the like), or a component of the user communication device, that is configured to comprise computing and communications (for example, close proximity wireless, including Bluetooth, WiFi, near field communications (NFC) and any other future higher speed close proximity connection) capabilities.

All references to "a/an/the element, apparatus, component, means, etc." are to be interpreted openly as referring to at least one instance of the element, apparatus, component, means, etc., unless explicitly stated otherwise. The discussion above and below in respect of any of the aspects of the present disclosure is also in applicable parts relevant to any other aspect of the present disclosure.

FIG. 1 illustrates an exemplary network architecture 100 including a plurality of user equipments wishing to share data therebetween in which the embodiments of the present disclosure may be practiced. As illustrated in FIG. 1, each of UEs 1-3 forming a group is assumed to intend to share data of interest, such as photos or video clips, within the group. For this purpose, according to embodiments of the present disclosure, each UE may transmit a data-sharing request message to other members UE of the group. For example, the UE 1 may transmit its data-sharing request messages 1 to the UEs 2 and 3, the UE 2 may transmit its data-sharing request messages 2 to the UEs 1 and 3, and the UE 3 may likewise transmit its data-sharing request message 3 to the UEs 2 and 1. The transmission as performed by each UE is substantively the same as broadcasting since all members of the group would receive the transmission from other member. Upon receipt of the data-sharing request messages from other UEs of the group, the UE is able to extract timestamps included in the messages and obtain respective times when respective received message are transmitted. By comparing theses times, the UE may determine itself as a sender or receiver in the forthcoming data-sharing operation, as will be discussed in detail later.

FIG. 2 is a simplified flow chart schematically illustrating a method 200 for performing data-sharing in a network, for example, one as illustrated in FIG. 1, according to an embodiment of the present disclosure. As illustrated in FIG. 2, at S202, the method 200 transmits, from a user equipment of a plurality of user equipments within a local area, a first data-sharing request message to at least another user equipment of the plurality of user equipments. According to example embodiments, the local area may be, for example, a coverage area of a wireless access point to which the plurality of user equipments have access, an area within which a Bluetooth function in the user equipments could be launched for local data-sharing, or an area where a link local WiFi connection can be established between the plurality of user equipments.

At S204, the method 200 receives, at the user equipment, at least one second data-sharing request message transmitted from at least the other user equipment, wherein the first data-sharing request message and at least one second data-sharing request message each include a timestamp indicating a time at which the data-sharing request message is transmitted. In an embodiment, the first data-sharing request message and the at least one second data-sharing request message each may include information associated with the data-sharing to be performed between the user equipments. For instance, the information may relate to at least one of a data type of the data to be shared (for example, types of music, image, and video, or, alternatively, indications of formats suitable for play or execution by corresponding players or applications) or an action type of an action (for example, fast data-sharing) to be performed for the data-sharing. In another embodiments, the first data-sharing request message and at least one second data-sharing request message each may include an identity of the user equipment which transmits the respective data-sharing request message. The identity may be a phone number, a nickname of the user, or any identifier suitable for easy identifying the users in the group. In this way, it is convenient for the member of the group to find out who would like to share data in the group.

The transmission and reception performed at S202 and S204 could be initiated by a user action or gesture. Depending on accompanying hardware, for example, a touch sensitive screen, action sensors, accelerometers, and gyroscopes, the user action or gesture may include, for example, swaying, tapping, double tapping, flicking, shaking, or making a throwing motion with the user equipment. It should be understood that these actions or gestures may be selected in setting options in an operating system of the user equipment and may be customized according to user's preference.

At S206, the method 200 compares the timestamp included in the first data-sharing request message and the timestamp included in the at least one second data-sharing request message. After that, at S208, the method 200 determines, based on a result of the comparing, whether the user equipment acts as a sender or receiver in the data-sharing to be performed. In an embodiment, the method 200 determines the user equipment as the sender and at least the other user equipment as the receiver in the data-sharing if the comparing indicates that the first data-sharing request message is transmitted earlier than the at least one second data-sharing request message. In another embodiment, the method 200 determines the user equipment as the receiver and at least the other user equipment as the sender in the data-sharing if the comparing indicates that the first data-sharing request message is transmitted later than the at least one second data-sharing request message.

From the above discussions about the method 200 in connection with FIG. 2 and a number of exemplary embodiments designed on its basis, it is apparent to those skilled in the art that the decision between a sender role and receiver role in the multiparty data-sharing could be determined by comparison of the timestamps. As a consequence, the transfer time for the data-sharing may be reduced by eliminating negotiation procedures and the user may enjoy a better user experience. Further, it should be noted that the order shown in FIG. 2 is only for an illustrative purpose and not by any means to limit the order to this specific form. For example, although S204 is shown subsequent to S202, it may be performed prior to or concurrently with S202. Additionally, it should be noted that the embodiments of the present disclosure could be flexibly applicable to a variety of local wireless communication environments, including Bluetooth, or WiFi or any future developed local communication techniques, as long as the timestamps used for determining whether the user equipment plays a role as a sender or as a receiver are broadcasted within the group.

FIG. 3 is a detailed flow chart schematically illustrating a method 300 for performing data-sharing according to another embodiment of the present disclosure. As illustrated in FIG. 3, at S302, a user equipment, for example, UE 1 in FIG. 1, broadcasts a data-sharing request message to other user equipments within a group of user equipments, such as one consisting of UE 1, UE 2, and UE 3 in FIG. 1. For example, like a Bluetooth or WiFi paging and scanning, the user equipment broadcasts the data-sharing request message during the searching of the other user equipments through a Bluetooth or WiFi discovery procedure. As aforementioned, the data-sharing request message may include a timestamp indicative of when the message is transmitted, an optional identifier identifying the user equipment, and an optional data type or action type for the data-sharing to be performed. The time as characterized by the timestamp may be obtained through a Global Positioning System (GPS) by which a GPS sensor embedded in the user equipment may receive time information from a satellite and use this piece of information to locate the position of the user equipment.

According to some example embodiments, when a user wants to share data with others or receive data from others, the user does not need to launch an application. Instead, the user equipment may be triggered to start broadcasting the data-sharing request message, by a user action or gesture configured in the setting options. As an implementation example, the user equipment may function as a normal Bluetooth or WiFi scan device for listening for the data-sharing request messages from other user equipments and may switch frequently between a broadcasting mode and a listening mode while scanning the local network. As a simplified example, the user equipment may begin broadcasting and listening after a "receiving" or "transmitting" gesture is made.

At S304, the user equipment may store the data-sharing request message in its memory, such as one shown in FIG. 4. In this manner, the user equipment is aware of when its data-sharing request message is broadcasted. At S306, the user equipment may also receive a number of similar data-sharing request messages from other members of the group. Then, at S308, one or more received data-sharing request messages may be stored in the memory of the user equipment. At S310, the user equipment compares its own timestamp with timestamps included in the received data-sharing request messages from other user equipments. At S312 the user equipment decides whether the received timestamps are earlier than its own timestamp. For example, the user equipment may sort the timestamps in a chronological order and select one user equipment that has the earliest timestamp as a sender and select itself as a receiver in the subsequent data-sharing. In case there are more than two user equipments having the earlier timestamps than the user equipment at issue, the user equipment would play the role of receiver in the data-sharing until the user equipments having the earlier timestamps complete their data-sharing. As an alternative, the times the user equipment plays the role as the sender or receiver in the data-sharing may be configurable such that the user equipment may change its role once the configured times are reached, thereby reducing the waiting time of the user equipment and further improving the user experience.

Then, if it is determined that the user equipment plays a role of receiving the data from another user equipment based on the result of S312 being "yes," the flow switches to S314, at which the user equipment may wait for the data connection from the other user equipment and upon successful establishment of the data connection, the user equipment may receive the data from the other user equipment. As a counterpart, the other user equipment playing a role of a sender may read the identifier from the received data-sharing request message from the user equipment and thereby determine the recipient, for example, the user equipment at issue, in the data-sharing. After that, it may initiate and establish the data connection with the user equipment and transmit the data thereto. If the result of S312 is "No," the flow switches to S316, at which the user equipment may play a role as a sender and similar to the aforementioned, the user equipment may actively establish the data connection with the other user equipments and transmit the data thereto until the data is fully conveyed.

The method of FIG. 3 may be performed in any order. For example, S306 and 308 may be conducted earlier than S302 and S304. Further, regarding selection of the data for sharing, as an example, the user may select a sharing object and wait for sharing when it is self-determined as a sender. As a further example, the user may first express the intention of sharing by broadcasting the data-sharing request through a predetermined gesture and then select the sharing object once it is self-determined as a sender. In this case, the user equipment may be triggered to prompt its user to select the sharing object once the role has been determined as a sender.

FIG. 4 is a schematic block diagram of an apparatus 400 for data-sharing according to embodiments of the present disclosure. As illustrated in FIG. 4, the apparatus 400 includes at least one processor 401, such as a data processor, at least one memory (MEM) 402 coupled to the processor 401, and a suitable RF transmitter TX and receiver RX 403 coupled to the processor 401. The MEM 402 stores a program (PROG) 404. The TX/RX 403 is for bidirectional wireless communications with a plurality of UEs, such as shown in FIG. 1. Note that the TX/RX 403 has at least one antenna to facilitate communication, though in practice an apparatus will typically have several for example, the MIMO communication. The apparatus 400 may be coupled via a data path to one or more external networks or systems, such as the internet, for example.

The PROG 404 is assumed to include instructions that, when executed by the processor 401, enable the apparatus 400 to operate in accordance with the exemplary embodiments of the present disclosure, as discussed herein with the methods 200 and 300.

In general, the embodiments of the present disclosure may be implemented by computer software executable by at least one processor 401 of the apparatus 400, or by hardware, or by a combination of software and hardware.

The MEM 402 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the apparatus 400, there may be several physically distinct memory units in the apparatus 400. The processor 401 may be of any type suitable to the local technical environment, and may include one or more of general purpose computers, special purpose computers, microprocessors, digital signal processors (DSPs) and processors based on multicore processor architecture, as non limiting examples. The apparatus 400 may have multiple processors, such as for example an application specific integrated circuit chip that is slaved in time to a clock which synchronizes the main processor. The apparatus 400 discussed herein may be embodied as a user equipment or a part thereof.

FIG. 5 is a simplified schematic block diagram illustrating another apparatus 500 for performing data-sharing according to another embodiment of the present disclosure. As illustrated in FIG. 5, the apparatus 500 comprises transmitting means (or means for transmitting) 501 configured to transmit, from a user equipment of a plurality of user equipments within a local area, a first data-sharing request message to at least another user equipment of the plurality of user equipments. The apparatus 500 also comprises receiving means (or means for receiving) 502 configured to receive, at the user equipment, at least one second data-sharing request message transmitted from at least the other user equipment, wherein the first data-sharing request message and at least one second data-sharing request message each include a timestamp indicating a time at which the data-sharing request message is transmitted. The apparatus 500 further comprises comparing means (or means for comparing) 503 configured to compare the timestamp included in the first data-sharing request message and the timestamp included in the at least one second data-sharing request message. The apparatus 500 additionally comprises determining means (or means for determining) 504 configured to determine, based on a result of the comparing, whether the user equipment acts as a sender or receiver in the data-sharing to be performed.

It is to be understood that the apparatus 500 as discussed above may carry out the methods 200 and 300 according to the embodiments of the present disclosure and may be embodied as a user equipment or a part thereof.

The techniques described herein may be implemented by various means so that an device implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation may be through modules (for example, procedures, functions, and so on) that perform the functions described herein. Further, computer programs can be coded for execution by the computing device to perform the methods according to various embodiments of the present disclosure. These computer programs can be stored in a computer program product, such as an optical disk.

Many modifications and other embodiments of the disclosure set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method, comprising:
   transmitting, from a user equipment of a plurality of user equipments within a local area, a first data-sharing request message to at least another user equipment of the plurality of user equipments;
   receiving, at the user equipment, at least one second data-sharing request message transmitted from at least the other user equipment, wherein the first data-sharing request message and at least one second data-sharing request message each include a timestamp indicating a time at which the data-sharing request message is transmitted;
   comparing the timestamp included in the first data-sharing request message and the timestamp included in the at least one second data-sharing request message; and
   determining, based on a result of the comparing, whether the user equipment acts as a sender or receiver in the data-sharing to be performed, wherein in case there are more than two user equipments having the earlier timestamps than the user equipment at issue, the user equipment plays the role of receiver in the data-sharing until the user equipments having the earlier timestamps complete their data-sharing, or
   the times the user equipment plays the role as the sender or receiver in the data-sharing is configured such that the user equipment changes its role once the configured times are reached.

2. A method according to claim 1, wherein the transmitting and receiving are triggered upon an action including at least one of swaying, tapping, flicking the user equipment.

3. A method according to claim 1, wherein the first data-sharing request message and the at least one second data-sharing request message each include information associated with the data-sharing to be performed between the user equipments.

4. A method according to claim 3, wherein the information relates to at least one of a data type of the data to be shared or an action type of an action to be performed for the data-sharing.

5. A method according to claim 3, wherein the first data-sharing request message and at least one second data-sharing request message each include an identity of the user equipment which transmits the respective data-sharing request message.

6. A method according to claim 1, wherein the determining comprises:
   determining the user equipment as the sender and at least the other user equipment as the receiver in the data-sharing if the comparing indicates that the first data-sharing request message is transmitted earlier than the at least one second data-sharing request message; and
   determining the user equipment as the receiver and at least the other user equipment as the sender in the data-sharing if the comparing indicates that the first data-sharing request message is transmitted later than the at least one second data-sharing request message.

7. An apparatus, comprising:
   at least one processor; and
   at least one memory including compute program instructions,
   wherein the at least one memory and computer program instructions are configured to, with the at least one processor, cause the apparatus at least to:
   transmit, from a user equipment of a plurality of user equipments within a local area, a first data-sharing request message to at least another user equipment of the plurality of user equipments;
   receive, at the user equipment, at least one second data-sharing request message transmitted from at least the other user equipment, wherein the first data-sharing request message and at least one second data-sharing request message each include a timestamp indicating a time at which the data-sharing request message is transmitted;
   compare the timestamp included in the first data-sharing request message and the timestamp included in the at least one second data-sharing request message; and
   determine, based on a result of the comparing, whether the user equipment acts as a sender or receiver in the data-sharing to be performed, wherein in case there are more than two user equipments having the earlier timestamps than the user equipment at issue, the user equipment plays the role of receiver in the data-sharing until the user equipments having the earlier timestamps complete their data-sharing, or
   the times the user equipment plays the role as the sender or receiver in the data-sharing is configured such that the user equipment changes its role once the configured times are reached.

8. An apparatus according to claim 7, wherein the at least one memory and computer program instructions are configured to, with the at least one processor, cause the apparatus to be triggered to transmit and receive upon an action including at least one of swaying, tapping, flicking the user equipment.

9. An apparatus according to claim 7, wherein the first data-sharing request message and the at least one second data-sharing request message each include information associated with the data-sharing to be performed between the user equipments.

10. An apparatus according to claim 9, wherein the information relates to at least one of a data type of the data to be shared or an action type of an action to be performed for the data-sharing.

11. An apparatus according to claim 9, wherein the first data-sharing request message and at least one second data-sharing request message each include an identity of the user equipment which transmits the respective data-sharing request message.

12. An apparatus according to claim 7, wherein the at least one memory and computer program instructions are configured to, with the at least one processor, cause the apparatus at least to:
   determine the user equipment as the sender and at least the other user equipment as the receiver in the data-sharing if comparison indicates that the first data-sharing request message is transmitted earlier than the at least one second data-sharing request message; and
   determine the user equipment as the receiver and at least the other user equipment as the sender in the data-sharing if comparison indicates that the first data-sharing request message is transmitted later than the at least one second data-sharing request message.

13. A non-transitory computer readable medium having program code stored thereon, the program code configured to direct an apparatus, when executed, to:
   transmit, from a user equipment of a plurality of user equipments within a local area, a first data-sharing request message to at least another user equipment of the plurality of user equipments;

receive, at the user equipment, at least one second data-sharing request message transmitted from at least the other user equipment, wherein the first data-sharing request message and at least one second data-sharing request message each include a timestamp indicating a time at which the data-sharing request message is transmitted;

compare the timestamp included in the first data-sharing request message and the timestamp included in the at least one second data-sharing request message; and determine, based on a result of the comparing, whether the user equipment acts as a sender or receiver in the data-sharing to be performed, wherein in case there are more than two user equipments having the earlier timestamps than the user equipment at issue, the user equipment plays the role of receiver in the data-sharing until the user equipments having the earlier timestamps complete their data-sharing, or the times the user equipment plays the role as the sender or receiver in the data-sharing is configured such that the user equipment changes its role once the configured times are reached.

* * * * *